June 27, 1944.   R. C. JOHNSON   2,352,203
THERMOSTATIC VALVE
Filed July 1, 1940
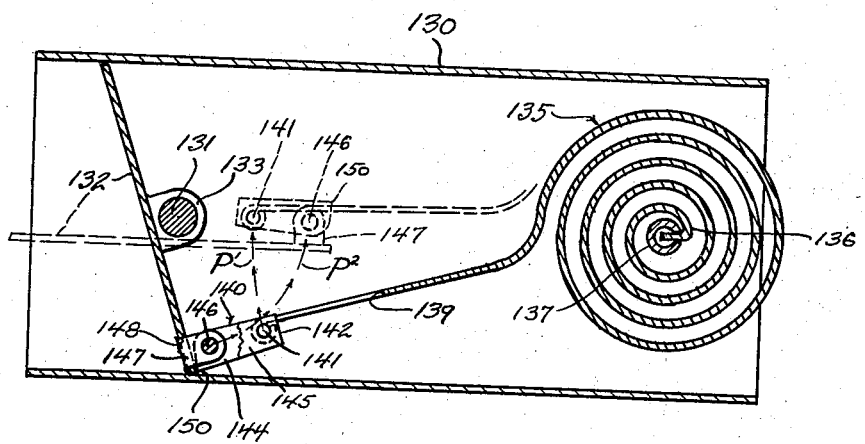
INVENTOR.
Roger C. Johnson Patented June 27, 1944

2,352,203

UNITED STATES PATENT OFFICE 2,352,203

THERMOSTATIC VALVE

Roger C. Johnson, Moline, Ill.

Application July 1, 1940, Serial No. 343,479

2 Claims. (Cl. 236—34)

The present invention relates to thermostatic valves and more particularly to thermostatic valve units adapted to be inserted or embodied in the water line of an automobile cooling system to control the flow of the cooling medium through the automobile engine in accordance with the temperature of the cooling medium.

The principal object of this invention is the provision of a thermostatic valve in which for given increments of displacement of the thermal element the initial opening movement of the valve is at a slow rate which, however, increases at an accelerated rate as the valve approaches its full open position. This is especially advantageous when the thermal element is a bi-metallic member, in which the power available for any given temperature change is limited. Moreover, when the flow controlling valve is in its closed position it is subjected to considerable pressure from the water pump. Also, when operating under conditions of low outside air conditions, as near or below 0° F., it takes only a very small opening of the valve to provide all the circulation needed. With these conditions in mind it is a feature of the invention to provide connections between the valve and the thermal element which provide a slow opening valve at times when power and/or accurate control is needed, but in which after the valve has been moved only a relatively small distance away from its fully closed position the movement of the valve becomes increasingly greater as the valve approaches its fully open position. Thus, small movement and relatively great power are available when they are needed, but without interfering with the full opening of the valve within a given temperature range.

Another feature of this invention is to provide a connection between the valve and the thermal element arranged so that the connection lies substantially flat against the valve when the latter is in its open position, whereby to secure as little obstruction to fluid flow as possible. This is important in securing an initial slow and powerful movement of the valve starting from its closed position, followed by a movement of the valve which is actually proportionately greater than the movement of the thermal element. Stated in another way, it is a feature of this invention to provide a valve opened and closed by a thermal element in which at first the valve moves much slower than the thermal element and then later moves appreciably faster than the thermal element. Still further, another object of this invention is to secure this action with only a single movable element between the thermally moved part and the valve.

These and other objects and advantages of the present invention will be apparent to those skilled art after a consideration of the following detailed description of the preferred embodiments, in which the principles of the present invention have been incorporated, taken in conjunction with the accompanying drawing.

The single figure of the drawing is a longitudinal sectional view showing, by way of illustration, a hose-line thermostat.

The form of the invention shown in the drawing includes a casing 130, apertured at diametrically opposite points, or substantially so, to receive a transverse shaft 131. A valve 132 is provided with apertured ears 133 by which the valve 132 is mounted for pivotal movement on the shaft 131. A coiled bimetallic thermostat 135 is disposed in the casing with its coils transverse and is anchored at its inner end 136 to a transverse post 137 that is fixed in any suitable manner at its outer ends to the casing 130. The free or operative end of the thermostat 135 extends generally axially of the casing 130 and is slotted, as at 139, and coiled about a pin 141 so as to be pivotally connected therewith. The pin member 141 is carried at the end 142 of a U-shaped link 140, the end 142 lying within the slot 139. The opposite ends 144, 145 of the link 140 are disposed on the opposite sides of and are pivoted, as by a pin 146, to a bracket 147. The latter is secured to the valve 132 in any suitable manner, as by being inserted into a hole 148 therein and riveted in place so as to be rigidly and permanently fixed to the valve. The ends 144, 145 of the link 140 are extended, as at 150, to provide a stop to keep the link from being swung downwardly beyond the position shown in the figure.

The thermostatic valve unit operates as follows. When the valve is closed the link 140 and the end of the thermostat lie in a straight line relation, whereby the initial opening of the valve will take place at a relatively slow rate. While I have shown the end of the thermostat 135 as serving as the operating member for the link 140, it will be understood that, if desirable, a link may be pivoted on or near the post 137 and connected at the other end to the end 142 of the link 140, such link being swung by the thermostat in any suitable manner. The pivots and relations of the various parts are so arranged that as the thermostat 135 expands, the pin 141, which swings the link 140, moves through the path $P^1$ while the pin 146 which is connected with the valve and which receives the other end of the link 140 moves through the path P². Both of the paths P¹ and P² in this form of the invention lie in substantially the same plane. However, the paths P¹ and P² are divergent; that is, when the valve 132 is open (dotted lines) the paths P¹ and P² are separated by a distance which is substantially equal to the effective length of the link 140. Thus, the pin 141 need move only up to a position substantially in line with the shaft 131 to swing the valve 132 wide open. Preferably, when the valve is closed the link 140 is arranged so as to be substantially perpendicular to a line connecting the shaft 131 and the pin 146. This form of the invention has the advantage that with the arrangement of the pivots and parts shown, the valve is opened with a slow powerful movement during the first few degrees of opening movement, but without any sliding friction or cam action. However, after the valve has started to open, its movement is rapidly accelerated and the valve is swung freely into its wide open position, yet only a relatively small angular displacement of the thermostat is required. During the initial opening movement of the valve, the latter moves slower than the thermostat, but after the valve has been opened several degrees its movement is accelerated, relative to the corresponding movement of the thermostat, until the valve moves faster than the thermostat. As the valve moves up to within a few degrees of its wide open position its movement, relative to the corresponding movement of the thermostat, is at a slower rate. This is, however, an advantage in that it permits the thermostat to continue to expand after the valve is open, yet such additional expansion will have very little effect in starting to move the valve back to a closed position.

While I have shown and described above the preferred means in which the principles of the present invention have been embodied, it is to be understood that my invention is not to be limited to the particular details shown and described above, but that, in fact, widely different means may be employed in the practice of the broader aspects of my invention.

What I claim and desire to secure by Letters Patent is:

1. A thermostatic valve comprising a supporting member through which fluid to be controlled is adapted to flow, a valve pivoted thereto for movement about an axis between open and closed positions, thermally responsive means connected with said supporting member and including a portion movable at a distance from and generally about an axis in response to changes in the temperature to which said means is subjected, said axes being fixed in a given relation with respect to said supporting member and each other and a link pivoted adjacent one end to a portion of the valve spaced a distance from the pivot axis of the latter and adjacent the other end to said thermally responsive portion, the distance between said axes and the effective radii of said valve portion, to which one end of the link is connected, and of said movable portion of the thermally responsive means, respectively, being such that when the valve is swung from closed to open position said link is turned approximately end for end and both said link and said thermally responsive portion are disposed closely adjacent and substantially flat against the valve.

2. A thermostatic valve as defined in claim 1, further characterized by the axis of movement of said thermally responsive portion being substantially parallel to the axis of movement of said valve and said thermally responsive portion and link means lying in a line substantially perpendicular to the plane passing through the axis of said valve and the point of connection of said link means with the valve, whereby the initial opening movement of said valve is relatively slow compared to the corresponding movement of said thermally responsive portion.

ROGER C. JOHNSON.